United States Patent
Jebens

[11] Patent Number: 5,828,055
[45] Date of Patent: Oct. 27, 1998

[54] WIDE-BAND TUNED INPUT CIRCUIT FOR INFRARED RECEIVERS

[75] Inventor: Robert W. Jebens, Skillman, N.J.

[73] Assignee: Lucent Technologies Inc., Murray Hill, N.J.

[21] Appl. No.: 736,700

[22] Filed: Oct. 28, 1996

[51] Int. Cl.⁶ .................................................. H01J 40/14
[52] U.S. Cl. .................. 250/214 R; 250/214.1; 327/514; 359/172
[58] Field of Search ............................ 250/214.1, 214 R; 359/172, 180; 327/514

[56] References Cited

U.S. PATENT DOCUMENTS

| | | | |
|---|---|---|---|
| 3,634,849 | 1/1972 | Nishizawa et al. | 250/214 R |
| 4,959,535 | 9/1990 | Garret | 250/214 R |
| 5,319,191 | 6/1994 | Crimmins | 359/181 |
| 5,532,474 | 7/1996 | Dautet et al. | 250/214 R |

*Primary Examiner*—Stephone B. Allen

[57] ABSTRACT

A wide-band tuned photodiode input circuit comprising: a photodiode; an step up double tuned network having an input and an output. The double tuned network is responsive to the photodiode. The input is capacitively coupled to the photodiode.

20 Claims, 5 Drawing Sheets

WIDE-BAND TUNED INPUT CIRCUIT FOR INFRARED RECEIVERS

CROSS REFERENCES TO RELATED APPLICATIONS

This application is related to U.S. patent applications Ser. No. 08/762,553, entitled "High Efficiency Resonant Network Drive For An Infrared LED" filed on Dec. 9, 1996; Ser. No. 08/723,732, entitled "Optical Arrangement For Full Duplex Free Space Infrared Transmission" filed on Sep. 30, 1996, and Ser. No. 08/962,552 entitled "Self Adjusting Tuned Resonant Photodiode Input Circuit, filed Dec. 9, 1996, having a common assignee and a common inventor.

FIELD OF THE INVENTION

This invention relates generally to infrared communications, and more particularly to infrared receivers.

BACKGROUND OF THE INVENTION

Current Infrared Data Association (IRDA) products and other infrared products such as wireless headphones, which utilize scatter light from room surfaces, provide half duplex (one way) communications. Attempts to provide full duplex operation in general fail because of overload and intermodulation of the receiver while the transmitter is operating. This occurs even though the transmitter and receiver operate at different carrier frequencies (not different light wavelengths). When an object which reflects some light is nearby, such as a hand, very large amounts of transmitted light can be returned to the receiver.

It is desirable to consider a form of FM modulation on a carrier as a modulation scheme rather than a base band modulation scheme. While IRDA devices use base band modulation, the devices relate to line of sight applications with only a meter range. Here considerable optical gain can be utilized at the transmitter and receiver with only a thirty degree field of view requirement.

In normal noisy room environments, for instance, solid state ballasted florescent lighting, there is a huge light noise background. This is very intense at low frequencies since the ballast switching frequency is approximately 20 kHz which produces a high harmonic content 40 kKz light noise. The intensity of noise is greatly decreased at approximately 300 or 400 kHz. In this frequency band, noise spikes occur every 20 kHz having a fine structure of two lines spaced about 2 kHz apart with finer noise lines on either side occurring every 120 Hz. In addition, each light fixture is not synchronized in frequency so that by the tenth harmonic, noise lines may be almost anywhere. With that type of ambient light noise background, the issue of photodiode shot noise and receiver front end noise become relatively less important for free space communications using scattered light. The transmitted light power has to be high enough so that at the receiver the desired signal and not the noise captures the FM receiver. This in principle could be helped by using a spread spectrum approach, however spread spectrum circuitry uses up power that could be traded off with increased transmitted light power, which would accomplish a similar effect. Utilizing a much higher frequency to get above the noise harmonics is limited by the LED efficiency and the capacitive reactance of the photodiode. At higher frequencies the input stage noise level of the receiver and the photodiode shot noise due to ambient light intensity become increasingly more important.

In an FM photodiode receiver a real problem is the harmonic generation in the front end because of the nonlinear capacitance of the photodiode. In an article entitled "Frequency Multiplication with Nonlinear Capacitors—A Circuit Analysis" by D. B. Leeson et al published in Proceedings of IRE Volume 47 pages 2076–2084 on December 1959, it is discussed that varactor diodes can be efficient harmonic generators. As a result of this effect, if there are large amplitude signals either from interference or "reflected" transmitted signals such that the voltage excursion changes the capacitance somewhat, then harmonics are generated or intermodulation products are formed that occur in the pass band of the receiver and can not be removed by selectivity. While this effect is made smaller by having the reverse bias voltage as large as possible, the effect is still the limiting factor of "effective" selectivity with large signals.

Therefore, there is a need to provide an efficient, linear, wide-band tuned photodiode input circuit.

SUMMARY OF THE INVENTION

In accordance with the present invention, there is provided a wide-band tuned photodiode input circuit. The circuit comprises: a photodiode; a double tuned network having an input and an output. The double tuned network is responsive to the photodiode. The photodiode is capacitively coupled to the double tuned circuit to allow to bias the photodiode.

BRIEF DESCRIPTION OF THE DRAWINGS

A more complete understanding of the present invention may be obtained from consideration of the following description in conjunction with the drawing in which.

DETAILED DESCRIPTION OF VARIOUS ILLUSTRATIVE EMBODIMENTS

Although the present invention is particularly well suited for use with infrared LEDs and photodiodes, and shall be described with respect to this application, the methods and apparatus disclosed here can be applied to other light transmitting and receiving devices equally as well.

Figure 1:
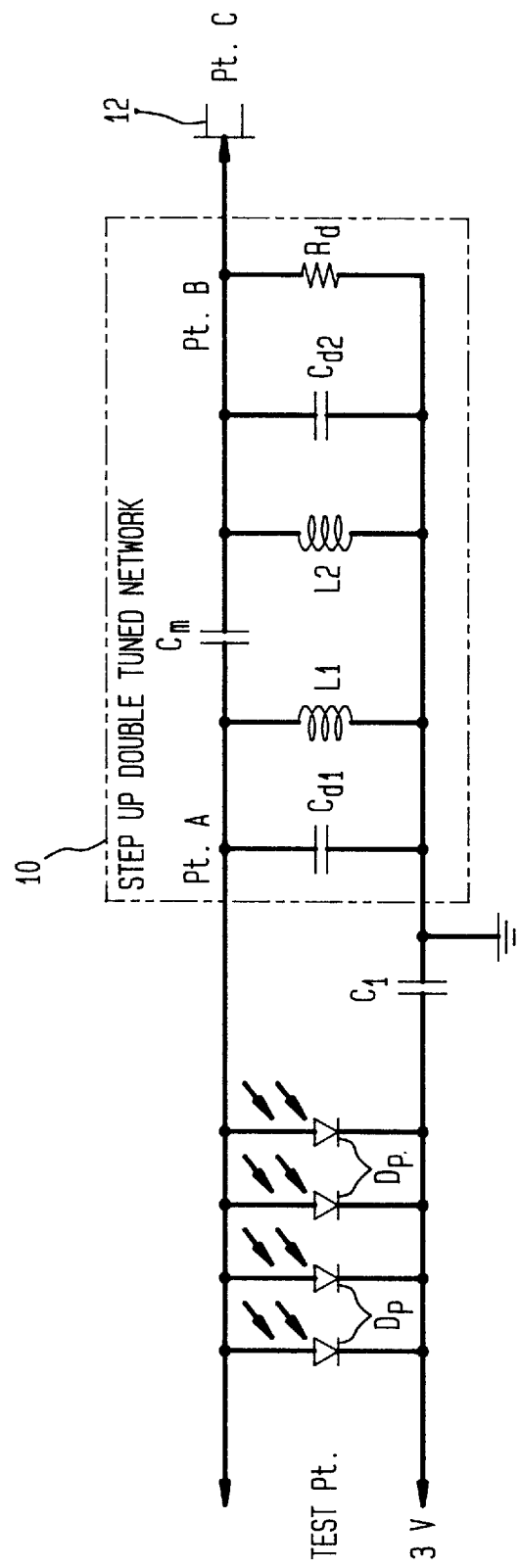
FIG. 1 is a schematic diagram of the present invention a wide-band tuned input circuit for infrared receivers.

Referring to FIG. 1 there is shown a schematic diagram of the present invention a wide-band tuned input circuit for infrared receivers. Four photodiodes, $D_p$, such as BWP34A, are reversed biased with a three volt supply and have a combined capacitance of 93.7 pF. The four photodiodes, $D_p$, are coupled to a step up double tuned network with capacitive coupling (DT Network) 10. The cathodes of the photodiodes, $D_p$, are coupled through a capacitor $C_1$ to the ground side of the DT Network 10 input. The anodes of the photodiodes, $D_p$, are coupled to the other side of the DT Network 10 input. The DT Network 10 is comprised of a transformer having a first coil with an inductance of $L_1$, a second coil with an inductance of $L_2$, with distributed capacitances $C_{d1}$ and $Cd_2$, respectively. The mutual coupling between the two coils is due to $C_m$. A damping resistor $R_d$ is coupled across the output of the DT Network 10 to obtain critical coupling. A JFET 12 is operated in the source follower or cascode configuration.

In an exemplary embodiment, the DT Network 10 can be a step up double tuned circuit, with $L_1$=2.06 mH and $L_2$=9.41 mH ($C_{d1}$=2 pF and $C_{d2}$=2.3 pF) which is capacitively coupled by $C_m$ having a value of 19.9 pF and resistively loaded by $R_d$ having a value of 53,600 ohms on the secondary side feeding the input stage of a low capacitance JFET 12.

To more fully understand the properties of this circuit, graphical representations of data obtained where the test point is driven by a network analyzer through a one megohm resistor having a very low capacitance of 0.035 pF, which functions as a good current source that is representative of a photo diode current signal. The input to the network analyzer is driven by a FET probe having a one megohm resistance shunted by a capacitance of 1.5 pF as the loading effect. The frequency range for most of the sweeps is from 250 kHz to 450 kHz with a designed center frequency of 350 kHz. The network analyzer is normalized so that a 10,000 ohm resistor to ground is 0 dB when it is driven by the current source and probed by the high impedance FET probe, this point is indicated by a small triangle on the graphs shown in FIGS. 2, 5, 6, and 7.

Figure 2:
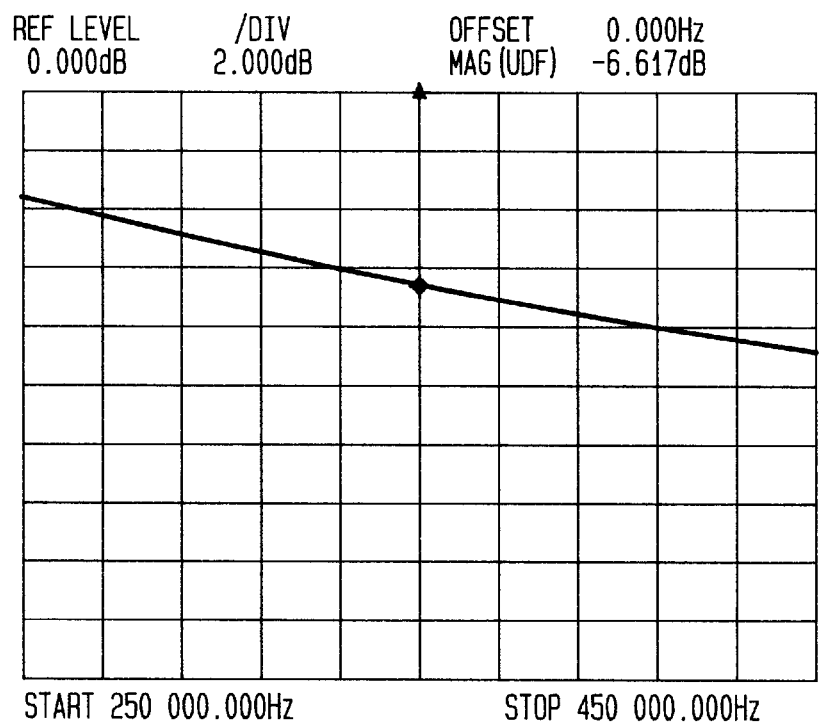
FIG. 2 is the response on a network analyzer of photodiodes only.

FIG. 2 is a graphical representation of the response of the four photodiodes $D_p$. The response decreases with increasing frequency which is the result of the capacitive reactance. It has a value at 350 kHz of slightly under 5,000 ohms.

Figure 3:
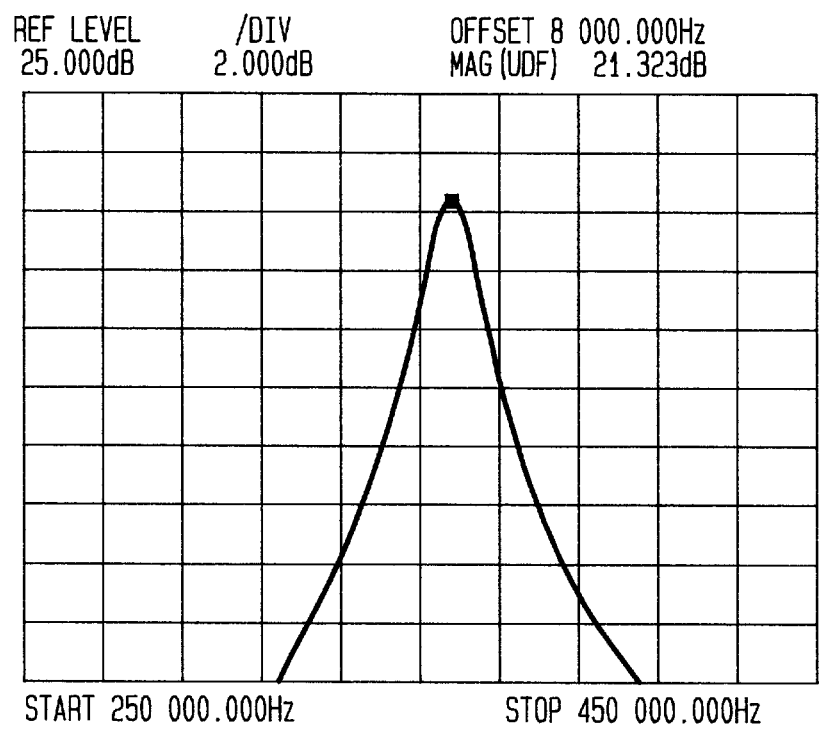
FIG. 3 is the response on a network analyzer with a parallel inductor.

Referring to FIG. 3, there is a graphical representation of when an inductor, $L_1$ with a value of 2.06 mH, is placed in parallel with the photodiodes. This circuit is probed at point A. A Q was measured at about 28. This Q is lower than would be if the photodiodes were perfect capacitors, taking into account the loading effect of the measuring circuit and the true Q of $L_1$, which is 83. The distributed capacity of $L_1$, $C_{d1}$, which has a value of 2 pF, is very small in comparison to the capacitance of the photodiodes, therefore it has a small effect on the size of the signal voltage developed by the photodiode signal current.

Figure 4:
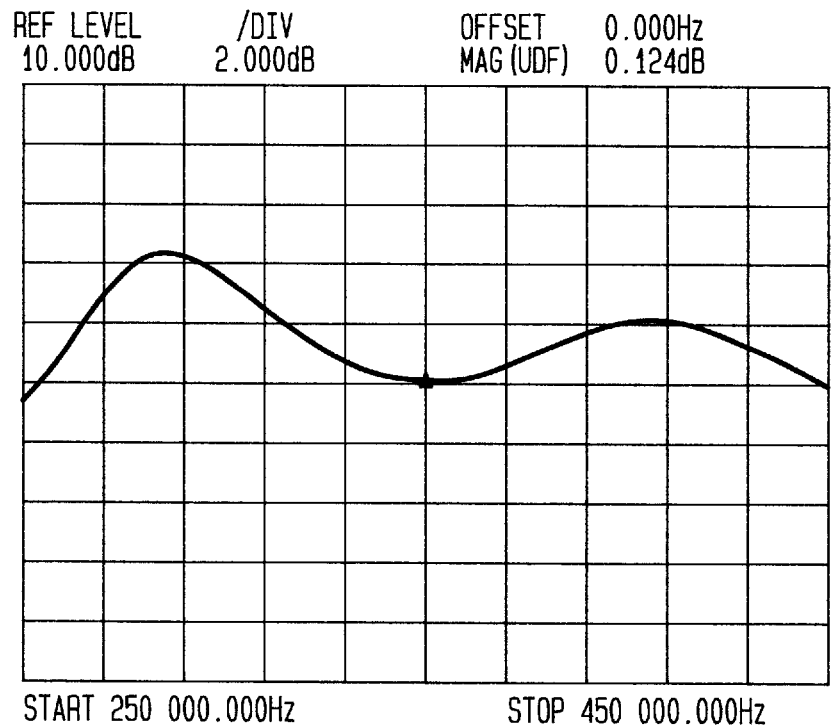
FIG. 4 is the response on a network analyzer at point A.

When point A is probed in the circuit shown in FIG. 1, then an interesting result which is shown in FIG. 4 is observed. The signal present across the photodiodes, $D_p$, is only a little over a factor of two greater than would be present across just the photodiodes, $D_p$. The voltage gain of this circuit at point B is a factor of five. Replacing the circuit with a single tuned circuit having a Q of 5 to also yield a voltage gain of five, the signal across the photodiodes would be a factor of five larger, rather than a factor of two in the present invention. In infrared systems, such as a full duplex system, which may be subject to very large interfering signals, nonlinearity of the photodiode capacitance generating harmonics and intermodulation products is important. The present invention keeps the signal level across the photodiodes, $D_p$, in the passband smaller and therefore decreases the problems associated with nonlinear capacitance effects.

Figure 5:
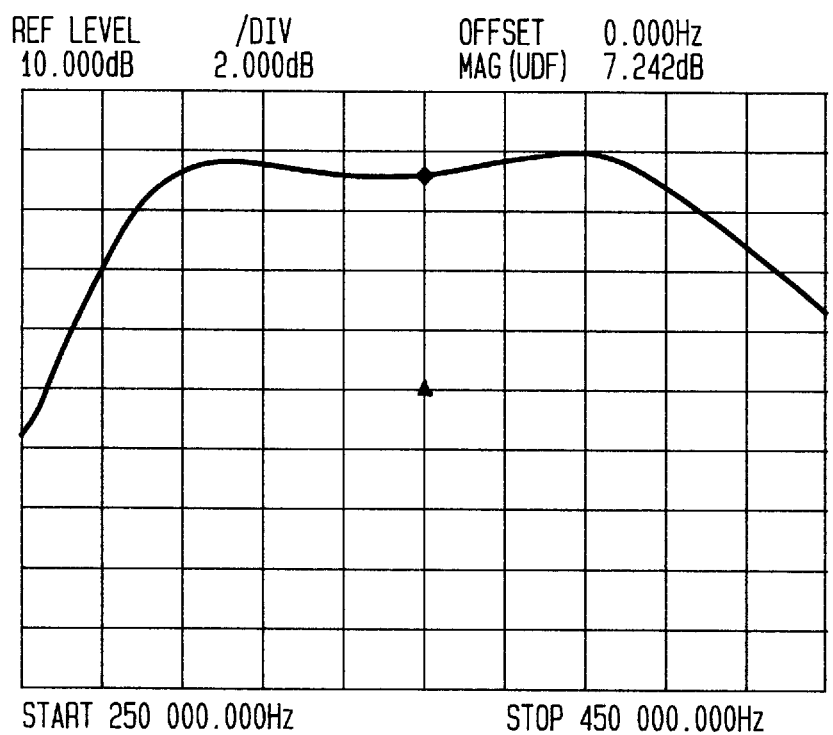
FIG. 5 is the response on a network analyzer at point B.
Figure 6:
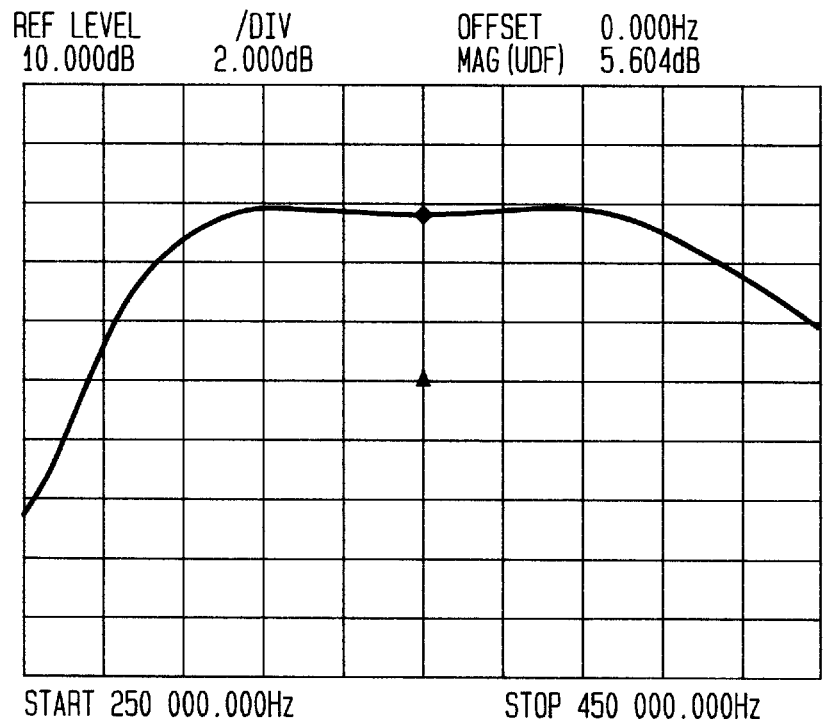
FIG. 6 is the response on a network analyzer at point C.

Referring to FIG. 5, there is shown the response at point B which shows a gain or equivalent Q of five. The slight tilt and frequency shift of the response is caused by a 1.5 pF loading of the probe. FIG. 6, is the response at point C when the JFET 12 is used in a source follower configuration with a loss of about 1.5 dB. The 3 dB bandwidth for this response is about 150 kHz or 43 percent fractional bandwidth. A single tuned circuit having a Q of 5 with an equivalent signal gain only has a 20 percent bandwidth with a less flat passband shape and poorer selectivity.

Figure 7:
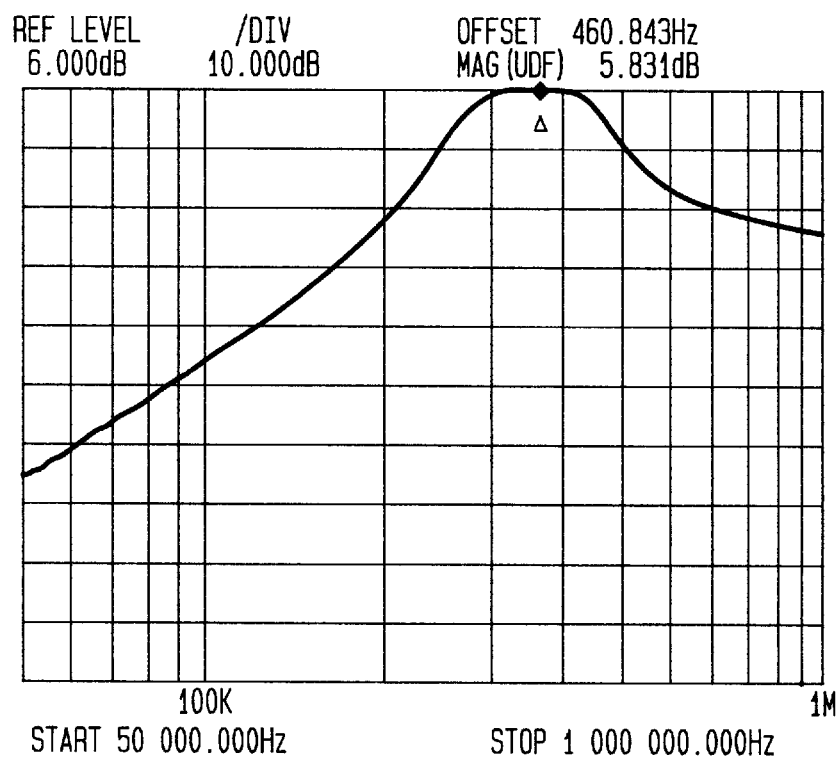
FIG. 7 is the response on a network analyzer of a wideband selectivity curve; and, FIG. 8 is the response of selectivity curves at 2.7, 3.0 and 3.3 volts.

Referring to FIG. 7, there is shown a graphical representation of the wide band skirt selectivity of the present invention. On the low frequency side the shirt selectivity is 18 dB per octave due to the fact that the mutual coupling capacitor, $C_m$, contributes an additional 6 dB per octave over the standard 12 dB per octave of an inductively coupled double tuned circuit. In contrast, a single tuned circuit only has a 6 dB per octave skirt selectivity. The additional selectivity is very important with respect to ambient light noise rejection and intermodulation effects in following stages from an interfering carrier in a full duplex system.

The proportions of values of the components in the circuit shown in FIG. 1 are quite different from a standard capacitively coupled double tuned circuit. Typically, the capacitance tuning the inductor, $L_2$, would be much larger than the value of the mutual coupling capacitor, $C_m$. However, it is desirable to have as large of a signal as possible at the gate of JFET 12. Therefore, a large impedance transformation is desired. To match the high impedance of the JFET 12, only the gate capacitance of about 5 pF and the distributed capacitance of $L_2$ which is 2.3 pF are in parallel with the inductor $L_2$. Using the source follower or cascode configuration ensures minimum input device capacitance. This permits the use of the largest inductor, $L_2$, and the smallest value of $C_m$ yielding the largest impedance transformation or voltage gain. Most of the effective capacitance tuning $L_2$ is due to $C_m$ which has a value of 19.9 pF.

The resistance $R_d$ which adjusts the Q of the circuit to make it critically coupled with the value of $C_m$ is placed on the secondary side of the circuit for noise considerations and to minimize reflected loading effects from the output circuitry of the JFET 12. In the article entitled "An Analysis of the Signal-to-Noise Ratio of Ultra-High-Frequency Receivers", by E. W. Herold published in RCA Review, Vol. 6, January 1942, pp. 302–331, it is shown that the signal to noise ratio is maximized with all of the damping on the output side of a double tuned circuit which has been confirmed by experiment.

As the desired bandwidth of the circuit is reduced the value of $C_m$ is reduced while the values of $L_2$ and $R_d$ become larger. The effective gain or Q increases approaching but not reaching a Q of 28, which is the Q of the photodiodes and $L_1$ as a single tuned circuit. The selectivity and response remains better but the minimum bandwidth is limited by the large size of $L_2$ required and the high impedance of point B becoming sensitive to the pick up of noise. An analysis of the capacitive coupled double tuned circuit is presented in an article by J. R. Nelson, entitled "A Theoretical Comparison of Coupled Amplifiers With Staggered Circuits," Proc. I.R.E., Vol. 20, July 1932, pp 1216–1219.

Figure 8:
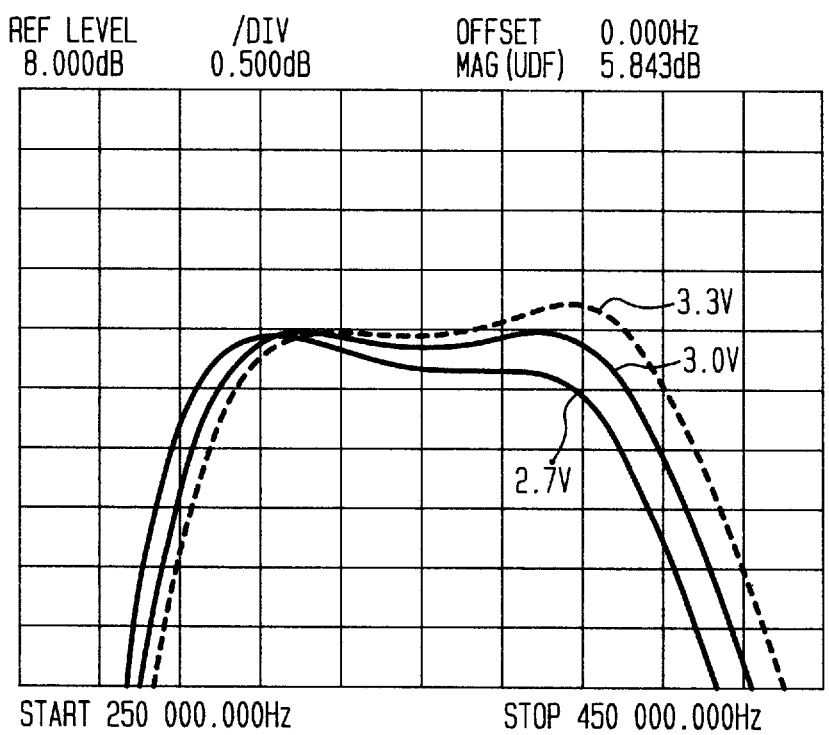

A further advantage of the circuit over a single tuned circuit is that it is much less sensitive to supply voltages because the capacitance of the photodiodes, $D_p$, is only one part of the frequency determining elements. The effects of changing the reverse bias supply plus and minus ten percent from the nominal three volts (2.7V, 3.0V and 3.3V) is shown in FIG. 8. There is about 0.25 dB of tilt and less than 10 kHz shift in the response. Therefore, voltage variations at most would only require a slight increase in the desired design bandwidth.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. A wide-band tuned photodiode input circuit comprising:

a photodiode; and a double tuned network having an input and an output, said double tuned network responsive to said photodiode, said input capacitively coupled to said photodiode, said double tuned network having mutually dependent stages;

wherein said double tuned network increases noise immunity and increases frequency selectivity at a given frequency.

2. The circuit as recited in claim 1 further comprising a resistor coupled across said output for damping said double tuned network to obtain critical coupling.

3. The circuit as recited in claim 1 wherein said double tuned network has capacitive mutual coupling.

4. The circuit as recited in claim 1 wherein said double tuned network comprises a transformer having capacitive mutual coupling, an input inductance and an output inductance.

5. The circuit as recited in claim 4 wherein capacitance in parallel with said output inductance is smaller than said capacitive mutual coupling.

6. The circuit as recited in claim 1 wherein an active device is coupled to said output, said active device operated in a source follower configuration.

7. The circuit as recited in claim 5 wherein said active device is a low capacitance JFET.

8. The circuit as recited in claim 1 wherein an active device is coupled to said output, said active device operated in a cascode configuration.

9. The circuit as recited in claim 8 wherein said active device is a low capacitance JFET.

10. A wide-band tuned photodiode FM receiver input circuit comprising:

a photo diode; and a step up double tuned network having an input and an output, said step up double tuned network responsive to said photodiode, said input capacitively coupled to said photodiode, said double tuned network having mutually dependent stages;

wherein said double tuned network increases noise immunity and increases frequency selectivity at a given frequency.

11. The circuit as recited in claim 10 further comprising a resistor coupled across said output for damping said step up double tuned network to obtain critical coupling.

12. The circuit as recited in claim 10 wherein said step up double tuned network has capacitive mutual coupling.

13. The circuit as recited in claim 10 wherein said step up double tuned network comprises a transformer having capacitive mutual coupling, an input inductance and an output inductance.

14. The circuit as recited in claim 13 wherein capacitance in parallel with said output inductance is smaller than said capacitive mutual coupling.

15. The circuit as recited in claim 10 wherein an active device is coupled to said output, said active device operated in a source follower configuration.

16. The circuit as recited in claim 14 wherein said active device is a low capacitance JFET.

17. The circuit as recited in claim 10 wherein an active device is coupled to said output, said active device operated in a cascode configuration.

18. The circuit as recited in claim 17 wherein said active device is a low capacitance JFET.

19. A wide-band tuned photodiode FM receiver input circuit comprising:

a photodiode;

a step up double tuned network comprising a transformer having an input and an output, said input and said output having a capacitive mutual coupling, said step up double tuned network responsive to said photodiode, said input capacitively coupled to said photodiode, and said double tuned network having mutually dependent stages;

a resistor coupled across said output for damping said step up double tuned network to obtain critical coupling;

wherein said double tuned network increases noise immunity and increases frequency selectivity at a given frequency.

20. The circuit as recited in claim 19 wherein capacitance in parallel with said output inductance is smaller than said capacitive mutual coupling.

* * * * *